United States Patent [19]
Yano et al.

[11] Patent Number: 6,077,896
[45] Date of Patent: Jun. 20, 2000

[54] CURABLE COMPOSITION

[75] Inventors: Ayako Yano, Kakogawa; Masayuki Fujita, Himeji; Hiroshi Iwakiri, Kobe, all of Japan

[73] Assignee: Kaneka Corporation, Osaka, Japan

[21] Appl. No.: 09/151,095

[22] Filed: Sep. 10, 1998

[30] Foreign Application Priority Data

Sep. 10, 1997 [JP] Japan .................................. 9-265046

[51] Int. Cl.$^7$ ...................................................... C08K 5/10
[52] U.S. Cl. .......................... 524/308; 524/320; 524/386; 524/387
[58] Field of Search .................... 524/386, 387, 524/308, 320

[56] References Cited

U.S. PATENT DOCUMENTS

| | | | |
|---|---|---|---|
| 4,413,086 | 11/1983 | Chang et al. ............................ | 524/386 |
| 4,902,575 | 2/1990 | Yukimoto et al. ...................... | 428/447 |

FOREIGN PATENT DOCUMENTS

WO 95/26998  10/1995  WIPO .

OTHER PUBLICATIONS

Database WPI, Section Ch, Week 8825, Derwent Publications Ltd., London, GB; Class A25, AN 88–171026, XP002086523 & JP 63 108058 A (Toshiba Silicone KK), May 12, 1988, abstract.

Primary Examiner—Melvyn I. Marquis
Attorney, Agent, or Firm—Pollock, Vande Sande & Amernick

[57] ABSTRACT

It is an object of the present invention to provide a curable composition capable of providing good rubber-like mechanical properties with low stress and high elongation, without sacrificing tack, recovery, curability, weathering resistance, storage stability and other characteristics.

This invention relates to a curable composition which comprises (a) an oxyalkylene polymer containing at least one reactive silyl group per molecule thereof and (b) a compound having an intramolecular $\alpha, \beta$-diol or $\alpha, \gamma$-diol structure.

11 Claims, No Drawings

CURABLE COMPOSITION

FIELD OF THE INVENTION

The present invention relates to a curable composition capable of curing by moisture to give cured products excellent in tensile characteristics with low stress and high elongation.

PRIOR ART

Reactive silyl-containing polymers are crosslinked and cured in the presence of moisture. Among them, curable compositions in which a polymer having a polyoxypropylene as the main chain skeleton is used occur as liquids at room temperature and has a characteristic such that they give rubber-like elastomers upon curing, and they are used as sealants for building or construction, for instance.

When a curable composition is used for building purposes, it should desirably be low in stress and high in elongation so that it can follow the shrinkage of joints.

For attaining a low stress characteristic, a method is known which comprises reducing the reactive silyl group content. In that case, however, free molecular chains not involved in crosslinking remain, presumably causing surface tack (sticky condition). Another problem is that decreased rubber characteristics, in particular reduced recovery, will result.

SUMMARY OF THE INVENTION

Accordingly, it is an object of the present invention to provide a curable composition capable of providing good rubber-like mechanical properties with low stress and high elongation, without sacrificing tack, recovery, curability, weathering resistance, storage stability and other characteristics.

Thus, the present invention is concerned with a curable composition which comprises (a) an oxyalkylene polymer containing at least one reactive silyl group per molecule thereof and (b) a compound having an intramolecular α, β-diol or α, γ-diol structure.

Detailed description of the invention is mentioned below.

DETAILED DESCRIPTION OF THE INVENTION

The above-mentioned component (a) contains at least one reactive silyl group per polymer molecule. When the number of reactive silyl groups per molecule is less than 1, the curability will be insufficient. The above range is therefore critical. When said number is too large, an excessively dense network structure will result, failing to show good mechanical characteristics. Thus, said number is preferably 1.1 to 5.

The main chain skeleton of the above-mentioned oxyalkylene polymer containing at least one reactive silyl group per molecule (a) has a repeating unit represented by the following general formula (1):

$$-R^1-O- \quad (1)$$

wherein $R^1$ represents a divalent organic group.

The above-mentioned $R^1$ is not limited to any particular species but includes various divalent organic groups, preferably straight or branched alkylene groups containing 1 to 14 carbon atoms, more preferably straight or branched alkylene groups containing 2 to 4 carbon atoms.

The repeating unit shown by the above general formula (1) is not limited to any particular species but includes, among others, $-CH_2O-$, $-CH_2CH_2O-$, $-CH_2CH(CH_3)O-$, $-CH_2CH(C_2H_5)O-$, $-CH_2C(CH_3)_2O-$, $-CH_2CH_2CH_2CH_2O-$ and the like.

The main chain skeleton of the above-mentioned oxyalkylene polymer may comprise one repeating unit or two or more different repeating units represented by the above general formula (1). For use as sealants or the like, in particular, polymers derived from propylene oxide as the main component are preferred.

The main chain skeleton of the above-mentioned oxyalkylene polymer may contain another component, such as a urethane bond component, within limits within which the characteristics of the oxyalkylene polymer are not much impaired.

Said urethane bond component is not limited to any particular species but includes, for example, those derived from the reaction of an aromatic polyisocyanate such as toluene (tolylene) diisocyanate, diphenylmethane diisocyanate or xylylene diisocyanate or an aliphatic polyisocyanate such as isophorone diisocyanate or hexamethylene diisocyanate with a polyol having the repeating unit of the above general formula (1).

The reactive silyl group contained in the component (a) mentioned above is represented by the following general formula (2):

$$-[Si(R^2)_{2-a}(X)_aO]_p-Si(R^3)_{3-b}(X)_b \quad (2)$$

wherein $R^2$ and $R^3$ are the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R^4)_3SiO-$ (wherein the three of $R^4$ represent monovalent hydrocarbon groups containing 1 to 20 carbon atoms, and may the same or different) and, when two or more $R^2$ and/or $R^3$ groups are present, they may be the same or different; X represents a hydrolyzable group or a hydroxyl group and, when two or more X groups are present, they may be the same or different; a represents an integer of 0 to 2; b represents an integer of 0 to 3; and p represents an integer of 0 to 19 and, when p is 2 or more, the a in the p of $-[Si(R^2)_{2-a}(X)_aO]$ groups may be the same or different. In the reactive silyl group represented by the above general formula (2), there is at least one hydrolyzable group or hydroxyl group represented by X.

The above-mentioned alkyl group containing 1 to 20 carbon atoms includes, but is not limited to, methyl, ethyl, isopropyl, butyl, t-butyl, cyclohexyl and the like.

The above-mentioned aryl group containing 6 to 20 carbon atoms includes, but is not limited to, phenyl, naphthyl and the like.

The above-mentioned aralkyl group containing 7 to 20 carbon atoms includes, but is not limited to, benzyl and the like.

The above-mentioned monovalent hydrocarbon group containing 1 to 20 carbon atoms includes, but is not limited to, methyl, ethyl, isopropyl, butyl, t-butyl, pentyl, ethynyl, 1-propenyl, vinyl, allyl, 1-methylbutyl, 2-ethylbutyl, phenyl and the like.

The above-mentioned hydrolyzable group represented by X is not limited to any particular species but includes the known ones, such as a hydrogen atom, halogen atoms, and alkoxyl, acyloxy, ketoximate, amino, amido, acid amido, aminoxy, mercapto, alkenyloxy and like groups. Among these, a hydrogen atom and alkoxyl, acyloxy, ketoximate, amino, amido, aminoxy, mercapto and alkenyloxy groups are preferred and, from the viewpoint of mild hydrolyzability and ease of handling, alkoxyl groups are particularly preferred.

One to three hydroxyl groups and/or hydrolyzable groups each presented by X may be bound to one silicon atom. The sum total of the hydroxyl and/or hydrolyzable groups in the reactive silyl group represented by the above general formula (2) is preferably within the range of 1 to 5.

The number of silicon atoms forming the above-mentioned reactive silyl group may be 1 or 2 or more. In the case of silicon atoms bound together via siloxane bond, said number may be up to 20.

In the practice of the present invention, those reactive silyl groups which are represented by the general formula (4) shown below are preferred among the reactive silyl groups represented by the above general formula (2) because of their ready availability:

$$—Si(R^3)_{3-b}X_b \qquad (4)$$

wherein $R^3$, X and b are as defined above.

Referring to the component (a) mentioned above, the method of introducing the above-mentioned reactive silyl group is not critical but may be any known one. Typical examples are mentioned below.

(1) The method comprising reacting an oxyalkylene polymer having an intramolecular functional group, such as a hydroxyl group, with an organic compound having an active group and unsaturated group capable of reacting with said functional group to thereby provide an unsaturated group-containing oxyalkylene polymer, or preparing an unsaturated group-containing oxyalkylene polymer by copolymerization with an unsaturated group-containing epoxy compound, and then hydrosilylating the thus-obtained unsaturated group-containing oxyalkylene polymer with a hydrosilane having a reactive silyl group.

(2) The method comprising reacting the unsaturated group-containing oxyalkylene polymer obtained in the same manner as mentioned above under (1) with a mercapto- and reactive silyl-containing compound.

(3) The method comprising reacting an oxyalkylene polymer having an intramolecular functional group, such as a hydroxyl, epoxy or isocyanate group, with a compound having a reactive silyl group and a functional group capable of reacting with said intramolecular functional group.

Among the methods mentioned above, the method (1), or the method comprising reacting a hydroxyl-terminated polymer with an isocyanato- and reactive silyl-containing compound, which falls under the category of method (3), is preferred.

The above-mentioned component (a) may be straight-chained or branched, and preferably has a molecular weight of about 500 to 50,000, more preferably 1,000 to 30,000.

Typical examples of the above-mentioned component (a) include, but are not limited to, those disclosed in Japanese Kokoku Publications Sho-45-36319 and Sho-46-12154, Japanese Kokai Publications Sho-50-156599, Sho-54-6096, Sho-55-13767, Sho-55-13468 and Sho-57-164123, Japanese Kokoku Publication Hei-3-2450, U.S. Pat. Nos. 3,632,557, 4,345,053, 4,366,307 and 4,960,844, for instance, and those high-molecular-weight oxyalkylene polymers having a number average molecular weight of not less than 6,000 and a narrow molecular weight distribution as indicated by a Mw/Mn ratio of not more than 1.6 which are disclosed in Japanese Kokai Publications Sho-61-197631, Sho-61-215622, Sho-61-215623 and Sho-61-218632, for instance.

The reactive silyl-containing oxyalkylene polymer mentioned above may be used singly or two or more species thereof may be used combinedly. An oxyalkylene polymer blended with a reactive silyl-containing vinyl polymer may also be used.

The method of preparing the above-mentioned oxyalkylene polymer blended with a reactive silyl-containing vinyl polymer includes, but is not limited to, those disclosed in Japanese Kokai Publications Sho-59-122541, Sho-63-112642 and Hei-6-172631, for instance.

The method comprising polymerizing a (meth)acrylate ester monomer in the presence of the reactive silyl-containing oxyalkylene polymer mentioned above may also be employed. This production method includes, but is not limited to, those concretely disclosed in Japanese Kokai Publications Sho-59-78223, Sho-59-168014, Sho-60-228516 and Sho-60-228517, for instance.

The compound (b) having an intramolecular α, β-diol or α, γ-diol structure, which is to be contained in the curable composition of the present invention, includes those well known in the art. In the present specification, the α, β-diol structure means a structure comprising two hydroxyl groups bound to two neighboring carbon atoms and the α, γ-diol structure means a structure comprising two hydroxyl groups bound to two carbon atoms bound together via one carbon atom.

The above-mentioned compound having an intramolecular α, β-diol or α, γ-diol structure includes, but is not limited to, diols such as ethylene glycol, propylene glycol, 1,3-propanediol, 1,2-butanediol, 1,3-butanediol, 2,3-butanediol, pinacol, 2,2-dimethyl-1,3-propanediol and 2-methyl-2-hydroxymethyl-1,3-propanediol; triols such as glycerol, 1,2,6-hexanetriol, 1,1,1-tris (hydroxymethyl)propane, 2,2-bis (hydroxymethyl)butanol; tetraols and higher polyols such as pentaerythritol, D-sorbitol, D-mannitol, diglycerol and polyglycerol; glycerol monocarboxylic acid esters such as glycerol monostearate, glycerol monoisostearate, glycerol monooleate, glycerol monolaurate, glycerol monopalmitate, glycerol monocaprylate, glycerol monoacetate and glycerol monobehenate; polyglycerol carboxylic acid esters such as diglycerol monostearate, diglycerol monooleate, diglycerol monolaurate, tetraglycerol monostearate, tetraglycerol monooleate, tetraglycerol monolaurate, tetraglycerol distearate, tetraglycerol dioleate, tetraglycerol dilaurate, decaglycerol monostearate, decaglycerol monooleate, decaglycerol monolaurate, decaglycerol distearate, decaglycerol dioleate and decaglycerol dilaurate; pentaerythritol monocarboxylic acid esters such as pentaerythritol monostearate, pentaerythritol monoisostearate, pentaerythritol monooleate and pentaerythritol monolaurate; pentaerythritol dicarboxylic acid esters such as pentaerythritol distearate, pentaerythritol dioleate and pentaerythritol dilaurate; sorbitan monocarboxylic acid esters such as sorbitan monostearate, sorbitan monooleate, sorbitan monolaurate, sorbitan monopalmitate and sorbitan monobehenate; sorbitan dicarboxylic acid esters such as sorbitan distearate, sorbitan dioleate, sorbitan dilaurate, sorbitan dipalmitate and sorbitan dibehenate; glycerol monoalkyl ethers such as glycerol monostearyl ether, glycerol monooleyl ether, glycerol monolauryl ether and glycerol mono-2-ethylhexyl ether; polyglycerol alkyl ethers such as diglycerol monostearyl ether, diglycerol monooleyl ether, diglycerol monolauryl ether, tetraglycerol monostearyl ether, tetraglycerol monooleyl ether, tetraglycerol monolauryl ether, tetraglycerol distearyl ether, tetraglycerol dioleyl ether, tetraglycerol dilauryl ether, decaglycerol monostearyl ether, decaglycerol monooleyl ether, decaglycerol monolauryl ether, decaglycerol distearyl ether, decaglycerol dioleyl ether and decaglycerol dilauryl ether, pentaerythritol monoalkyl ethers such as pentaerythritol monostearyl ether, pentaerythritol monooleyl ether and pentaerythritol monolauryl ether; pentaerythritol dialkyl ethers such as pentaerythritol distearyl ether, pentaerythritol dioleyl ether and pentaerythritol dilauryl ether; sorbitan monoalkyl ethers such as sorbitan monostearyl ether, sorbitan monooleyl ether and sorbitan monolauryl ether; and sorbitan dialkyl ethers such as sorbitan distearyl ether, sorbitan dioleyl ether and sorbitan dilauryl ether.

Many of the compounds mentioned above are in general use as emulsifiers, surfactants, dispersants, antifoams, defogging agents, solubilizing agents, thickening agents and/or lubricants, and are readily available.

The compounds (b) mentioned above may be used singly or two or more of them may be used in combination.

The compounds (b) mentioned above are preferably used in an amount of 0.1 to 100 parts by weight per 100 parts by weight of the oxyalkylene polymer, namely component (a). When said amount is less than 0.1 part by weight, the desired effects can hardly be obtained. Amounts exceeding 100 parts by weight are undesirable since the problem arises that the mechanical strength of the cured products is insufficient. A more preferred range is 1 to 20 parts by weight.

Where necessary, the curable composition of the present invention may further contain various plasticizers.

Said plasticizers include, but are not limited to, phthalate ester plasticizers such as dimethyl phthalate, diethyl phthalate, dibutyl phthalate, diheptyl phthalate, dioctyl phthalate, diisononyl phthalate, diisodecyl phthalate, diisoundecyl phthalate, butyl benzyl phthalate, dilauryl phthalate and dicyclohexyl phthalate; epoxidized plasticizers such as epoxidized soybean oil, epoxidized linseed oil and benzyl epoxystearate; polyester plasticizers derived from dibasic acids and dihydric alcohols; polyethers such as polypropylene glycol and derivatives thereof; polystyrenes such as poly-$\alpha$-methylstyrene and polystyrene; polybutadiene, butadiene-acrylonitrile copolymers, polychloroprene, polyisoprene, polybutene, chlorinated paraffins and the like. These may be used singly, or two or more of them may be used in combination.

The plasticizers mentioned above are preferably used in an amount of 0.1 to 150 parts by weight per 100 parts by weight of the oxyalkylene polymer, namely component (a). When the amount exceeds 150 parts by weight, the liquid content increases, leading to lowered physical properties of the cured products.

The curable composition of the present invention may contain a silanol condensation catalyst for promoting the reaction of the reactive silyl group mentioned above.

Said silanol condensation catalyst includes, but in not limited to, those condensation catalysts which are generally used. For example, it can be titanate esters such as tetrabutyl titanate and tetrapropyl titanate; organotin compounds such as dibutyltin dilaurate, dibutyltin maleate, dibutyltin diacetate, stannous octylate, stannous naphthenate, reaction products from dibutyltin oxide and phthalate esters, and dibutyltin diacetylacetonate; organoaluminum compounds such as aluminum trisacetylacetonate, aluminum tris(ethyl acetoacetate) and diisopropoxyaluminum ethyl acetoacetate; reaction products from bismuth salts and organic carboxylic acids, such as bismuth tris(2-ethylhexoate) and bismuth tris(neodecanoate); chelate compounds such as zirconium tetraacetylacetonate and titanium tetraacetylacetonate; organolead compounds such as lead octylate; organovanadium compounds; amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl)phenol, morpholine, N-methylmorpholine, 2-ethyl-4-methylimidazole and 1,8-diazabicyclo (5.4.0)undecene-7 (DBU); salts of said amine compounds with carboxylic or other acids; low-molecular-weight polyamide resins derived from excess polyamines and polybasic acids; and reaction products from excess polyamines and epoxy compounds. These may be used singly, or two or more of them may be used combinedly.

Among the silanol condensation catalysts mentioned above, organometallic compounds and combination systems comprising organometallic compounds and amine compounds are preferred from the curability viewpoint.

The above-mentioned silanol condensation catalysts are preferably used in an amount of 0.01 to 20 parts by weight per 100 parts by weight of the reactive silyl-containing oxyalkylene polymer mentioned above, namely component (a). At an addition level below 0.01 part by weight, the rate of curing is slow and the curing reaction can hardly proceed to a satisfactory extent. At a level exceeding 20 parts by weight, local heat generation or foaming may occur during curing, with the result that good cured products can hardly be obtained. A more preferred addition level is 0.1 to 10 parts by weight.

In the curable composition of the present invention, there may further be added, when necessary, various additives such as dehydrating agents, compatibilizers, tackifiers, physical property modifiers, storage stability improving agents, fillers, antioxidants, ultraviolet absorbers, metal deactivators, antiozonants, light stabilizers, amine type radical chain inhibitors, phosphorus-containing peroxide decomposers, lubricants, pigments, foaming agents, flame retardants and antistatic agents, each in an adequate amount.

The fillers mentioned above include, but are not limited to, wood meal, walnut shell flour, rice hull flour, pulp, cotton chips, mica, graphite, diatomaceous earth, china clay, kaolin, clay, talc, fumed silica, precipitated silica, silicic anhydride, quartz powder, glass beads, calcium carbonate, magnesium carbonate, titanium oxide, carbon black, glass balloons, aluminum powder, zinc powder, asbestos, glass fiber and carbon fiber. These may be used singly, or two or more of them may be used combinedly.

To the curable composition of the present invention, there may be added another polymer having a reactive silyl group or groups in addition to the oxyalkylene polymer containing at least one reactive silyl group per molecule thereof, namely the above-mentioned component (a). As such, there may be mentioned, for example, polydimethylsiloxane and the like.

The method of preparing the curable composition of the present invention is not critical. The composition can be prepared, for example, by adding the compound (b) to the oxyalkylene polymer (a) and effecting uniform dispersion and dissolution, if necessary adjusting the heating and stirring conditions, for instance. It is not necessary, however, to attain a completely uniform and transparent condition. Even in an opaque condition, satisfactory effects can be obtained if dispersion has been attained.

In addition, the method comprising dissolving and mixing the components using a mixer, roll or kneader or the like may also be used.

If necessary, a dispersion improving agent may be used in combination.

The curable composition obtained in the above manner can be applied not only as a two-part but also as a one-part curable composition. In the case of one-part type, such a composition can be obtained by preparing the curable composition of the present invention in a substantially moisture-free state. When stored in a tightly closed state, such composition can endure long-period storage and, when exposed to atmospheric conditions, it rapidly undergoes curing from the surface.

The curable composition of the present invention is useful as an elastic sealant in the fields of building and construction works and in industrial applications. It can also be used as a paint, adhesive, poured filler, coating material or the like.

EXAMPLES

The following examples illustrate the present invention in further detail. They are, however, by no means limitative of the scope of the invention.

Example 1

A tightly closable kneader (planetary mixer) was charged with 65 weight parts of Kaneka MS polymer S203 (product of KANEKA) and 35 weight parts of Kaneka MS polymer S303 (product of KANEKA), each as a hydrolyzable silyl-terminated polymer, 70 weight parts of DIDP (diisodecyl phthalate) as a plasticizer, 200 weight parts of surface-treated heavy calcium carbonate as a filler, 10 weight parts of titanium oxide, 10 weight parts of an aliphatic amide wax as an antisagging agent, 1 weight part of an ultraviolet absorber, 1 weight part of a light stabilizer and 5 weight parts of glycerol, and the mixture was stirred under vacuum at 120° C. for 2 hours for dehydration. After cooling to room temperature, there were added 3 weight parts of vinyltrimethoxysilane as a viscosity stabilizer, 2 weight parts of N-(β-aminoethyl)-γ-aminopropyl-trimethoxysilane as a tackifier, and 1 weight part of dibutyltin diacetylacetonate as a curing catalyst. The whole mixture was then stirred at room temperature and filled into an airtight container. A one-part curable composition was thus obtained.

The composition obtained was evaluated for tensile properties, recovery and residual tack by the methods mentioned below. The results are shown in Table 1.

Tensile properties

The composition obtained was spread to a thickness of about 3 mm and allowed to stand at 23° C. and 55% RH for 3 days and at 50° C. for 4 days. The thus-obtained cured product was evaluated for tensile properties according to JIS K 6301.

Recovery

The cured product obtained as mentioned above was allowed to stand in sequence at 70° C. for 2 days, in water at 23° C. for 1 day, at 70° for 3 days, in water at 23° C. for 1 day and at 23° C. and 55% RH for 1 day. Thereafter, No. 3 dumbbell specimens were punched out therefrom and fixed in a tensile state such that the bench mark distance of 20 mm was extended to 40 mm. After 24 hours, the dumbbells were released from the fixation, and the recovery of the bench mark distance as attained in 1 hour was calculated.

Residual Tack

The composition obtained was spread to a thickness of about 3 mm and allowed to stand at 23° C. and 55% RH for 7 days and then touched with a fingertip, and the stickiness was evaluated according to the following criteria:

o: Almost no stickiness:

Δ: Sticky:

X: Considerably sticky.

Examples 2 to 5

The procedure of Example 1 was followed except that glycerol was replaced respectively with pentaerythritol monostearate, glycerol monoacetate, glycerol monostearate, or glycerol monostearyl ether. The results are shown in Table 1.

Comparative Example 1

The procedure of Example 1 was followed except that glycerol was not used. The results are shown in Table 1.

Comparative Examples 2 to 4

The procedure of Example 1 was followed except that glycerol was replaced respectively with glycerol tristearate, 2-ethylhexanoic acid triglyceride or stearyl stearate. The results are shown in Table 1.

Comparative Example 5

The procedure of Example 1 was followed except that the hydrolyzable silyl-terminated polymers were replaced with Kaneka MS polymer S203 alone. The results are shown in Table 1.

TABLE 1

|  | Example | | | | | Compar. Example | | | | |
| --- | --- | --- | --- | --- | --- | --- | --- | --- | --- | --- |
|  | 1 | 2 | 3 | 4 | 5 | 1 | 2 | 3 | 4 | 5 |
| Glycerol | 5 | — | — | — | — | — | — | — | — | — |
| Pentaerythritol monostearate | — | 5 | — | — | — | — | — | — | — | — |
| Glycerol monoacetate | — | — | 5 | — | — | — | — | — | — | — |
| Glycerol monostearate | — | — | — | 5 | — | — | — | — | — | — |
| Glycerol monostearyl ether | — | — | — | — | 5 | — | — | — | — | — |
| Glycerol tristearate | — | — | — | — | — | — | 5 | — | — | — |
| 2-ethylhexenoic acid triglyceride | — | — | — | — | — | — | — | 5 | — | — |
| Stearyl stearate | — | — | — | — | — | — | — | — | 5 | — |
| Kaneka MS polymer S203 | 65 | 65 | 65 | 65 | 65 | 65 | 65 | 65 | 65 | 100 |
| Kaneka MS polymer 9303 | 35 | 35 | 35 | 35 | 35 | 35 | 35 | 35 | 35 | — |
| Plasticizer DIDP | 70 | 70 | 70 | 70 | 70 | 70 | 70 | 70 | 70 | 70 |
| Calcium carbonate | 200 | 200 | 200 | 200 | 200 | 200 | 200 | 200 | 200 | 200 |
| Titanium oxide | 10 | 10 | 10 | 10 | 10 | 10 | 10 | 10 | 10 | 10 |
| Desagging agent | 10 | 10 | 10 | 10 | 10 | 10 | 10 | 10 | 10 | 10 |
| Ultraviolet | 1 | 1 | 1 | 1 | 1 | 1 | i | 1 | 1 | 1 |

TABLE 1-continued

| | | Example | | | | | Compar. Example | | | | |
|---|---|---|---|---|---|---|---|---|---|---|---|
| | | 1 | 2 | 3 | 4 | 5 | 1 | 2 | 3 | 4 | 5 |
| absorber | | | | | | | | | | | |
| Light stabilizer | | 1 | 1 | 1 | 1 | 1 | 1 | 1 | 1 | 1 | 1 |
| Vinylsilane | | 3 | 3 | 3 | 3 | 3 | 3 | 3 | 3 | 3 | 3 |
| Aminosilane | | 2 | 2 | 2 | 2 | 2 | 2 | 2 | 2 | 2 | 2 |
| Dibutyltin diacetylacetonate | | 1 | 1 | 1 | 1 | 1 | 1 | 1 | 1 | 1 | 1 |
| Evaluation results | Stress at 100% elongation (MPa) | 0.31 | 0.33 | 0.32 | 0.31 | 0.33 | 0.41 | 0.40 | 0.39 | 0.30 | 0.32 |
| | Breaking strength (MPa) | 1.30 | 1.14 | 1.21 | 1.20 | 1.10 | 1.35 | 1.19 | 1.20 | 1.25 | 1.17 |
| | Elongation at rupture (%) | 820 | 850 | 860 | 930 | 840 | 670 | 630 | 610 | 640 | 680 |
| | Recovery (%) | 62 | 63 | 62 | 60 | 61 | 63 | 60 | 61 | 61 | 51 |
| | Residual tack | ○ | ○ | ○ | ○ | ○ | ○ | ○ | ○ | ○ | Δ |

The present invention, which has the constitution mentioned above, can provide curable compositions with low stress and high elongation, without sacrificing tack, recovery and other physical properties.

We claim:

1. A curable composition which comprises (a) an oxyalkylene polymer containing at least one reactive silyl group per molecule thereof and (b) a compound having an intramolecular $\alpha,\beta$-diol or $\alpha,\gamma$-diol structure.

2. The composition of claim 1 wherein the oxyalkylene polymer contains 1.1 to 5 reactive silyl groups per molecule.

3. The composition of claim 1 wherein the compound having an intramolecular $\alpha,\beta$-diol or $\alpha,\gamma$-diol structure is at least one compound selected from the group consisting of diols. triols, polyols, glycerol monocarboxylic acid esters, polyglycerol carboxylic acid esters, pentaerythritol monocarboxylic acid esters, pentaeryithritol dicarboxylic acid esters, sorbitan monocarboxylic acid esters, sorbitan dicarboxylic acid esters, glycerol monoalkyl ethers, polyglycerol alkyl ethers, pentaerythritol monoalkyl ethers, pentaerythritol dialkyl ethers, sorbitan monoalkyl ethers and sorbitan dialkyl ethers.

4. The composition of claim 1 wherein the compound being $\alpha,\beta$-diol or $\alpha,\gamma$-diol structure is at least one compound selected from the group consisting of ethylene glycol, propylene glycol, 1,3-propanediol, 1,2-butanediol, 1,3-butanediol, 2,3-butanediol, pinacol, 2,2-dimethyl-1,3-propanediol, 2-methyl-2-hydroxymethyl-1,3-propanediol, glycerol, 1,2,6-hexanetriol, 1,1,1-tris(hydroxymethyl) propane, 2,2-bis(hydroxymethyl)butanol, pentaerythritol, D-sorbitol, D-mannitol, diglycerol, polyglycerol, glycerol monostearate, glycerol monoisostearate, glycerol monooleate, glycerol monolaurate, glycerol monopalmitate, glycerol monocaprylate, glycerol monoacetate, glycerol monobehenate, diglycerol monostearate, diglycerol monooleate, diglycerol monolaurate, tetraglycerol monostearate, tetraglycerol monooleate, tetraglycerol monolaurate, tetraglycerol distearate, tetraglycerol dioleate, tetraglycerol dilaurate, decaglycerol monostearate, decaglycerol monooleate, decaglycerol monolaurate, decaglycerol distearate, decaglycerol dioleate, decaglycerol dilaurate, pentaerythritol monostearate, pentaerythritol monoisostearate, pentaerythritol monooleate, pentaerythritol monolaurate, pentaerythritol distearate, pentaerythritol dioleate, pentaerythritol dilaurate, sorbitan monostearate, sorbitan monooleate, sorbitan monolaurate, sorbitan monopalmitate, sorbitan monobehenate, sorbitan distearate, sorbitan dioleate, sorbitan dilaurate, sorbitan dipalmitate and sorbitan dibehenate, glycerol monostearyl ether, glycerol monooleyl ether, glycerol monolauryl ether, glycerol mono-2-ethylhexyl ether, diglycerol monostearyl ether, diglycerol monooleyl ether, diglycerol monolauryl ether, tetraglycerol monostearyl ether, tetraglycerol monooleyl ether, tetraglycerol monolauryl ether, tetraglycerol distearyl ether, tetraglycerol dioleyl ether, tetraglycerol dilauryl ether, decaglycerol monostearyl ether, decaglycerol monooleyl ether, decaglycerol monolauryl ether, decaglycerol distearyl ether, decaglycerol dioleyl ether, decaglycerol dilauryl ether, pentaerythritol monostearyl ether, pentaerythritol monooleyl ether, pentaerythritol monolauryl ether, pentaerythritol distearyl ether, pentaerythritol dioleyl ether, pentaerythritol dilauryl ether, sorbitan monostearyl ether, sorbitan monooleyl ether, sorbitan monolauryl ether, sorbitan distearyl ether, sorbitan dioleyl ether and sorbitan dilauryl ether.

5. The composition of claim 1 wherein the compound having an intramolecular $\alpha,\beta$-diol or $\alpha,\gamma$-diol structure comprises glycerol.

6. The composition of claim 5 wherein the oxyalkylene polymer contains 1.1 to 5 reactive silyl groups per molecule.

7. The composition of claim 3 wherein the oxyalkylene polymer contains 1.1 to 5 reactive silyl groups per molecule.

8. The composition of claim 4 wherein the oxyalkylene polymer contains 1.1 to 5 reactive silyl groups per molecule.

9. The composition of claim 1 wherein the compound having an intramolecular $\alpha,\beta$-diol or $\alpha,\gamma$-diol structure is present in an amount of 0.1 to 100 parts by weight per 100 parts by weight of the oxyalkylene polymer.

10. The composition of claim 1 wherein the compound having an intramolecular $\alpha,\beta$-diol or $\alpha,\gamma$-diol structure is present in an amount of 1 to 20 parts by weight per 100 parts by weight of the oxyalkylene polymer.

11. The composition of claim 1 which further includes at least one member selected from the group of plasticizers, silanol condensation catalyst, and filler.

* * * * *